June 29, 1943.  R. W. WRIGHT  2,322,960
AUTOMATICALLY CLOSING PRESSURE RELEASE VALVE
Filed July 13, 1942  3 Sheets-Sheet 1
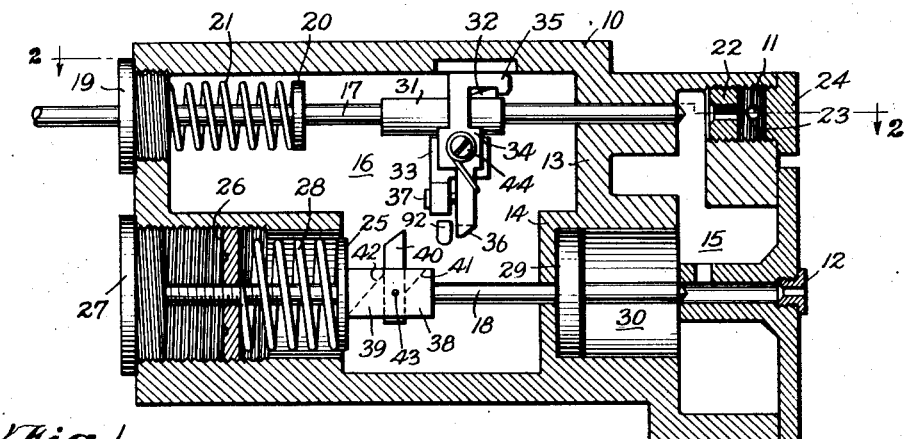
Fig. 1.
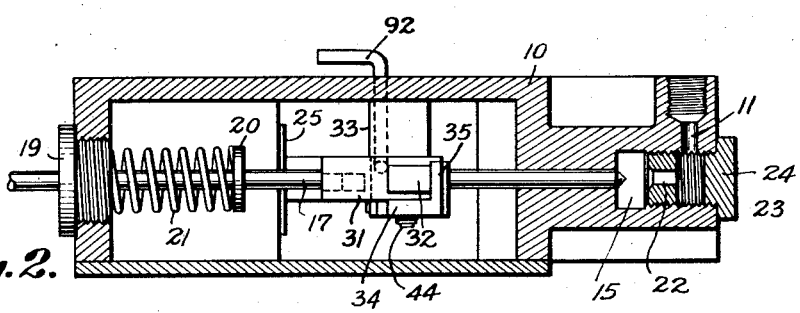
Fig. 2.
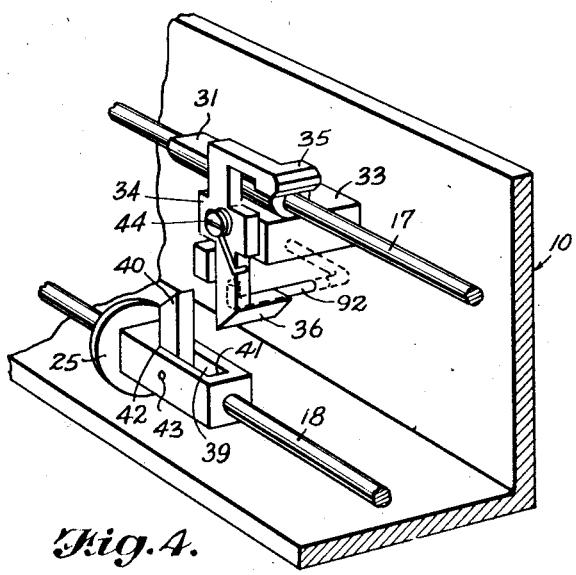
Fig. 4.
Fig. 3.
Inventor
Russell W. Wright,
By A. Yates Dowell
Attorney June 29, 1943.  R. W. WRIGHT  2,322,960
AUTOMATICALLY CLOSING PRESSURE RELEASE VALVE
Filed July 13, 1942   3 Sheets-Sheet 2
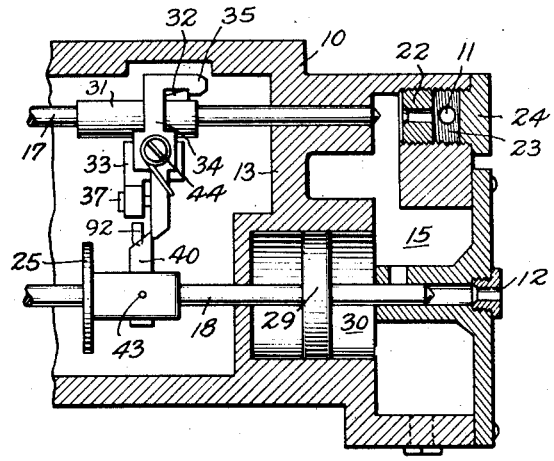
Fig. 5.
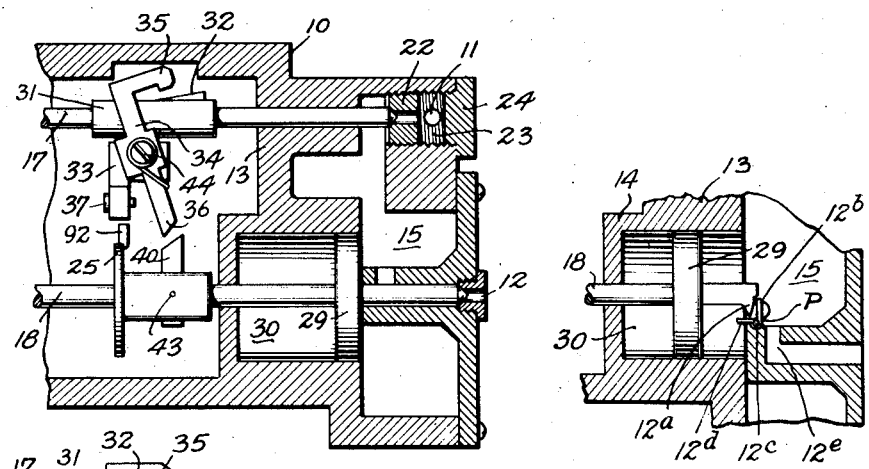
Fig. 6.
Fig. 8.
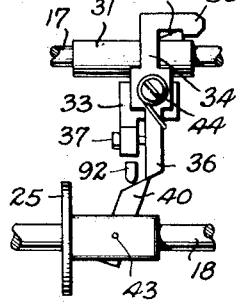
Fig. 7.
Inventor
Russell W. Wright,
By
Attorney June 29, 1943.   R. W. WRIGHT   2,322,960
AUTOMATICALLY CLOSING PRESSURE RELEASE VALVE
Filed July 13, 1942   3 Sheets-Sheet 3
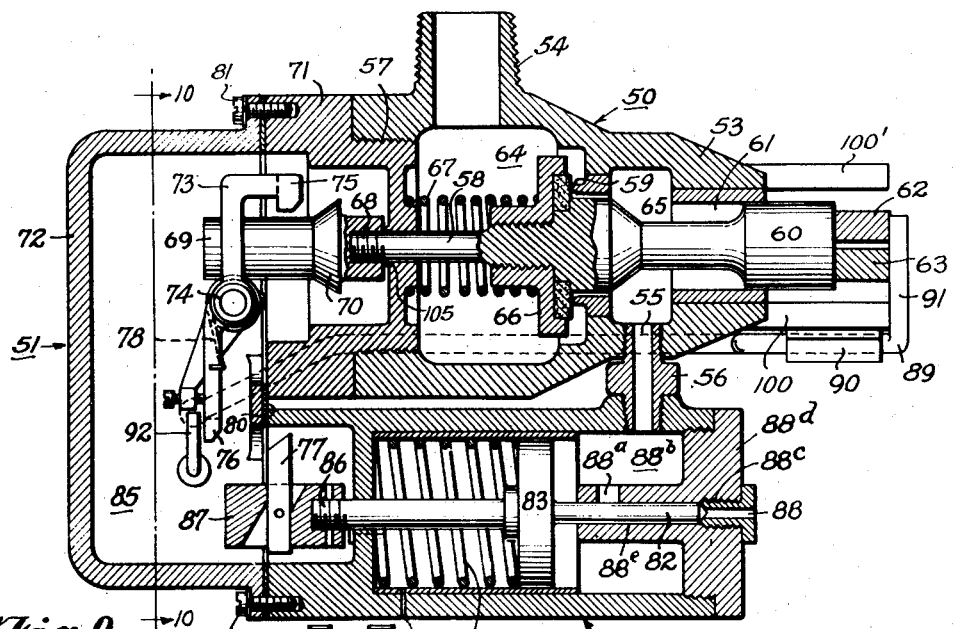
Fig. 9.
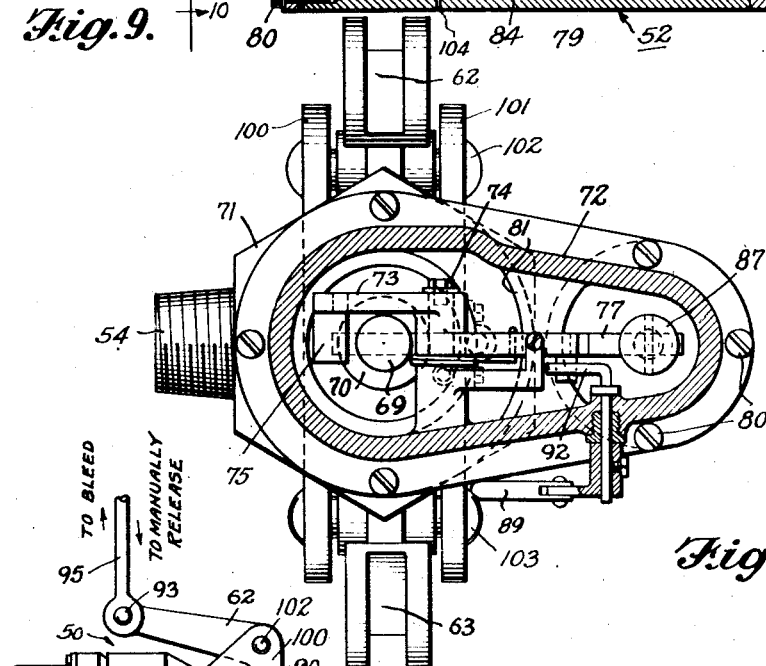
Fig. 10.
Fig. 11.
Inventor
Russell W. Wright,
By A. Yates Dowell
Attorney Patented June 29, 1943

2,322,960

UNITED STATES PATENT OFFICE 2,322,960

AUTOMATICALLY CLOSING PRESSURE RELEASE VALVE

Russell W. Wright, Sioux City, Iowa

Application July 13, 1942, Serial No. 450,710

2 Claims. (Cl. 303—80)

This invention relates to valves and more particularly to an automatic closure for pressure release valves.

Among the objects of the present invention is to provide a valve mechanism:

That will automatically close when the pressure in the valve housing reaches atmospheric pressure or a determined pressure.

For use in conjunction with the air brake installations on freight cars, that will not only automatically close but is automatically prevented from prematurely closing.

Further objects will more plainly appear from the detailed specification and drawings presented herein in exemplification but not in limitation of the present invention, which diagrammatically represents in:

Figure 1, a vertical transverse cross-sectional view of the valve closing assembly;

Fig. 2, a horizontal cross-sectional view of the assembly taken on the line 2—2 in Fig. 1;

Fig. 3, a fragmentary perspective view of the shaft latch;

Fig. 4, a fragmentary perspective view of the automatic release mechanism shown in Figs. 1 and 2;

Fig. 5, a fragmentary vertical cross-sectional view of the valve shown in Figs. 1 and 2 in a partially closed position at the moment before the latch is released;

Fig. 6, a like view showing the latch in its released position;

Fig. 7, a like view showing the trip lever in its forward position;

Fig. 8, a modification of the automatic outlet valve;

Fig. 9, a vertical cross sectional view of a modified form of the valve shown in Fig. 1;

Fig. 10, a horizontal cross sectional view of the valve taken on the line 10—10 in Fig. 9;

Fig. 11, an operating diagram illustrating the valve shown in Fig. 9.

Prior to this invention, the operation of bleeding the air brake valves on the auxiliary air tanks on individual freight cars has presented a serious problem. With present equipment, it is necessary for the operator to pull a lever on each freight car and hold it manually in its open position until in his opinion the valve has been completely bled or in other words until the air pressure in the mechanism has become normal or atmospheric. When eighty or ninety car freight trains have to be serviced in this manner, it is obvious that considerable time is required to complete the job for a single train. Furthermore, if the valve is manually released before pressure has become normal or atmospheric, the brakes on that car will not be properly released and when that car is next moved, the wheels will lock and usually become flat. This results in a critical loss of time when the car is out of service and a considerable expense to repair the flat wheels. A number of attempts have been made in the prior art to overcome these difficulties by employing springs or weights to counter-balance atmospheric pressure with some predetermined pressure but all of these prior methods have proven unreliable as they are inherently not positive in action and are therefore inaccurate.

By means of the present invention, all that is necessary for the operator to do on each car is pull out the lever and immediately leave that car and proceed to the next car in the train. As soon as the lever is pulled out, the novel automatic mechanism herein described will positively hold the valve open until normal atmospheric pressure is reached within the mechanism and then automatically close the valve, thus insuring against any subsequent seizure of the brake shoes with the resulting flat wheels.

A preferred embodiment of the present invention is illustrated in Fig. 1 wherein the housing 10 is provided with an intake orifice 11 and an outlet valve seat 12. Within the housing partition members 13 and 14 divide the housing into an air chamber 15 and a control chamber 16. Supported within the housing 10 are an operating valve shaft 17 and a secondary control valve shaft 18.

The shaft 17 is slidably held within the housing 10 by means of the adjustable nut 19 through which the shaft 17 is slidably engaged. A collar 20 is fixed to the shaft 17 in spaced relationship to the nut 19 when the shaft 17 is in normal position. Resilient means such as the spring 21 is held in position around the shaft 17 by means of the collar 20 and the nut 19. The other end of the shaft 17 is arranged to slidably protrude through the partition 13 in a snug sliding fit and is adapted in its forward position to engage the adjustable valve seat 22 positioned adjacent the intake orifice 11. This orifice communicates with an intake chamber 23 which is made accessible by the removable nut 24.

Affixed to the rear portion of the control shaft 18 is the collar 25 held thereon in spaced relationship to the adjustable nut 26 which is made accessible by means of the removable nut 27. Held between the adjustable nut 26 and the fixed collar 25 is resilient means 28 such as a spring adapted at atmospheric pressure to normally close the control shaft 18 in its seat at 12. Affixed to the shaft 18 in spaced relationship from the other end thereof is piston 29 adapted to travel in the cylinder well 30 which is formed by the lower partition 14 and the adjacent wall of the housing 10.

As shown in Fig. 3, the shaft 17 has affixed thereto a bearing member 31 having its upper surface provided with a pawl 32. Affixed to the rear wall of the housing 10 is a bracket member 33 shown in Fig. 4 adapted to support the bearing member 31 of the shaft 17. Pivotally connected to the bracket 33 is the trigger member 34 having an upper latch member 35 and a rearwardly extending lower latch member 36, the latch member 35 being adapted to engage the pawl member 32. Adjusting means such as the bolt 37 shown in Fig. 1 is held by the bearing member 33 and permits adjustment of the throw of the trigger member 34. Resilient means such as a spring may also be provided engaging the lower portion of the trigger member 34 and the bearing member 33 so that the trigger member 34 may be normally held in its forward engaged position.

Attached to the central portion of the shaft 18 is the slotted bearing member 38 as shown in Fig. 4 provided with the recess 39. Pivotally connected to the shaft 18 is the trip latch 40 whose forward movement is limited by the wall 41 of the recess 39 and whose rearward movement is limited by the upper edge of the wall 42 of the recess 39.

In operation, when the operating shaft 17 is pulled outwardly by the operator, the pawl 32 will slide under and into engagement with the latch arm 35 of the trigger 34 as shown in Fig. 1. This will hold the shaft 17 in its open position and prevent the spring 21 from seating the valve shaft 17 in the valve seat 22. With the valve seat 22 open, the compressed air entering the intake port 11 will pass through the open valve seat 22 and into the chamber 15 and the well 30 and through the outlet 12 into the atmosphere.

The pressure of this compressed air will also force the piston 29 into its rear position as shown in Fig. 1, thereby compressing the spring 28 and holding the shaft 18 in its open position so that the compressed air may thereby escape through the outlet 12. On this back stroke of the piston 29, the trip lever 40 will be tilted forwardly on its pivot 43 by the arm 36, to the position shown in Fig. 7. As the pressure in the well 30 and the chamber 15 drops upon the escape of air through the outlet 12, the pressure on the spring 28 will thus be relieved and the spring 28 will force the shaft 18 into its partially closed position as shown in Fig. 5, and back into its closed position, as shown in Fig. 6. This is assured by adjusting the tension on the spring 28 so that it will exert pressure equal to atmospheric pressure, or to whatever predetermined pressure is desired in the chamber 15. As the spring 28 forces the shaft 18 into its seated position the trip lever 40 will then engage the rear face of the latch arm 36, as shown in Fig. 5. This will cause the trigger member 34 to swing on its pivot 44, and will in turn move the upper trigger arm 35 out of engagement with the pawl 32, as shown in Fig. 6, thus permitting the spring 21 to force the shaft 17 into the valve seat 22, thus closing the intake 11.

If desired the chambers 15 and 88b, may be provided with a removable drain plug, for the escape of accumulated moisture. Also in certain installations it may be desirable to insert a check valve in the inlet 54 shown in Fig. 9. A manual release may also be provided as shown at 92 in Figs. 2 and 4, so that the valve may be closed by the operator at any time, if desired.

An added advantage is provided in the modification of the outlet control as illustrated in Fig. 8, wherein the control shaft 18 is provided with the cam portion 12a arranged to engage the legs 12b and 12d of the pivoted outlet valve P, to open and close the outlet 12e. In operation, as the pressure diminishes in 15, the shaft 18, the piston 29, and the cam 12a are urged in a forward direction by the spring 28. The cam 12a is so positioned that it will cause the leg 12b to close the outlet 12e before the trip latch 40 releases the trigger arm 35. This will cause pressure to build up in 15, and again retract the piston 29, causing the cam 12a to engage the leg 12d, and re-open the outlet 12e. This cycle may be repeated, depending on the amount of pressure present, until complete bleeding is attained. From the foregoing it becomes apparent that premature closing of the outlet is thereby prevented, and positive and complete bleeding of the entire mechanism is thereby assured.

A further modification of the mechanism illustrated in Figs. 1 to 8 inclusive is shown in Figs. 9 to 11 inclusive wherein the present invention is adapted to be applied as an attachment to release valves of a type long in use on freight cars.

Figs. 9 and 10 diagrammatically illustrate a novel modification of a release valve 50 to which the attachments 51 and 52 embodying the present invention have been applied.

The valve 50 comprises a casing 53 having an inlet 54 adapted for communication with an auxiliary air tank on a freight car, and an outlet port 55 in communication with the attachment 52 by means of the coupling 56. The base of the casing 53 is also provided with a threaded opening 57. The valve 50 is provided with a valve stem 58, a valve seat 59 and a piston 60 movable in the chamber 61 and adapted to project beyond the end of the casing 53 where it is engaged by the actuating arms 62 and 63. An inlet chamber is provided at 64 and an outlet chamber at 65. A spring retaining collar 66 is threaded to the stem 58 and engages the spring 67 adapted to normally hold the valve stem 58 in its closed position as shown in Fig. 9. The end of the valve stem 58 is provided with a threaded end portion 68 adapted to engage the extension member 69 which is provided with the pawl collar 70.

The attachment 51 comprises a coupling member 71 adapted to be threaded into the casing 53 by means of the threaded collar 57. Attached to the coupling member 71 is the cover member 72 to which the trigger member 73 is pivotally attached at 74, the upper end or pawl 75 of the trigger member 73 being adapted to engage the ratchet collar 70 when the valve stem 58 is in its depressed or open position. The lower end 76 of the trigger member 73 is arranged to extend downwardly to engage the latch member 77 of the attachment 52. A spring clip 78 is arranged to normally urge the trigger member 73 into engagement with the ratchet collar 70. Any similar well known clip may also be provided to urge the latch 77 into its upright or rear position. The attachment 52 may be provided with a small vent 104 to prevent accumulation of pressure therein.

The attachment 52 comprises a casing 79 adapted to be sealed to the cover 72 at 80, the cover 72 being sealed to the coupler 71 at 81.

Casing 79 is provided with a valve stem 82, a piston 83 normally urged outwardly by means of the spring 84, the inner end of the stem 82 being adapted to project through the casing 79 into the chamber 85 and to be attached at 86 to the latch bearing 87, the other end of the stem 82 being adapted to engage the valve seat 88c at the outlet port 88. The closure member 88d is arranged for threaded engagement with the casing 79 and is provided with a stem guide 88e which is in communication with the chamber 88b by means of the port 88a. A manual release rod 89 is held in position on the casing 53 by means of the guide member 90, the upper end 91 of the rod 89 is adapted to overlie the tops of the actuating arms 62 and 63, and the lower end 92 of the rod 89 is adapted to project into the casing 72 and is arranged to be in operative engagement with the lower end 76 of a trigger member 73, so that when the end 91 is moved outwardly by the operation of either of the arms 62 or 63, the end 92 will thereby be caused to move the arm 76 outwardly which will release the pawl 75.

Fig. 11 diagrammatically illustrates a top plan view of the valve members 50, 51 and 52 shown in an installed horizontal position when in use on a freight car. From this figure, it will be seen that the inner ends of the actuating arms 62 and 63 normally engage the outer end of the valve stem 60. The arms 62 and 63 are pivoted at 102 and 103 on the brackets 100 and 101 affixed to the casing 53. The outer ends of the arms 62 and 63 are provided with link connections 93 and 94 which are adapted to engage the operating rods 95 and 96 which project outwardly so that they may be operated by the brakeman from either side of the freight car.

In operation, when either of the rods 95 or 96 is pulled outwardly by the brakeman, the inner end of the arm 62 or the arm 63 depending upon which rod is used, will depress the valve stem end 60, and open the valve at seat 59 and permit air from the auxiliary tank on the freight car to enter the inlet 54 and to pass into the chambers 64, 65 and into 88b, through the conduit 55.

As soon as either of the arms 62 or 63 is thus actuated, the air pressure released thereby immediately forces the stem 68 into its rearward position so that the ratchet collar member 70 will engage the pawl 75 on the trigger 73, the pawl 75 being thus engaged will hold the stem 68 in its rearward position. This will permit the brakeman or operator to immediately let go of the rod 95 or 96 as the case may be and proceed to the next car without waiting for the valve to bleed.

At this moment the air pressure in the chamber 88b will be sufficient to force the piston 83 and the rod 82 and the release latch 77 into its rearward position so that the release latch 77 is behind and engages the lower end 76 of the trigger 73. When the trigger release 77 is in its rearward position, the valve stem 82 will also be in its rearward position and will thus expose the aperture 88a into communication with the outlet port 88, which will permit the air to escape. Thereafter, as soon as the air pressure in the chamber 88b has become equal to atmospheric pressure, the pressure in the chamber 88b and on the piston 83 will consequently be relieved and the spring member 84 being tensioned accordingly will immediately force the piston 83 into its forward position carrying with it the stem 82 and the release latch 77. As the release latch 77 moves forward it will engage the arm 76 of the trigger member 73 causing it to turn about the pivot 74 and to raise the pawl member 75, thereby releasing the ratchet member 70 and permitting the valve stem 68 to be urged forward by the spring 67 into its closed position at the seat 59. The valve stem 82 will also move forward and again close the aperture 88a and the outlet 88.

If for any reason it is desired to manually release the valve 50, this may be accomplished by the brakeman or by the operator by pushing inwardly on either of the rods 95 or 96. This will elevate the arm 62 or 63 as the case may be, either of which will in turn actuate the arm 91 of the manual release rod 89 slidably held in position by the bearing 90 on the casing 53. The lower crank arm 92 of the rod 89 will then engage and actuate the arm 76 of the trigger member 73 and release the pawl 75 from the ratchet 70 permitting the springs 67 and 84 to close the valve members 58 and 82 respectively.

The present invention comprehends all modifications, embodiments, and equivalents within the spirit and scope of the appended claims.

I claim:

1. An automatic pressure release mechanism comprising a casing, an inlet port, an outlet port, a primary valve in operating relation to said inlet port, a secondary valve in operating relation to said outlet port, engaging means for holding said primary valve when said valve is in open position, means actuated by the retraction of said secondary valve in response to predetermined pressure in said casing for releasing said engaging means, and means actuated by said secondary valve for closing said outlet port before releasing said engaging means.

2. In combination with a reservoir for the storage of air under pressure, a bleeding valve, comprising a casing enclosing a chamber having an outlet port and an inlet port in communication with said reservoir, a primary release valve arranged in operating relation with said inlet port, spring means arranged to normally hold said release valve in its closed position, a secondary control valve arranged in operating relation with said outlet port, spring means arranged to normally urge said control valve into its closed position, means responsive only to predetermined pressures in said chamber for moving said control valve into its open position, holding means actuated by the release of said primary valve for holding said primary valve in its open position, means actuated by the closing movement of said control valve in response to lower pressures for releasing said holding means, and means actuated by said closing movement of said secondary control valve for closing said outlet port before releasing said holding means.

RUSSELL W. WRIGHT.